United States Patent
Marr et al.

[11] 3,922,102
[45] Nov. 25, 1975

[54] DEVICE FOR FASTENING CABLE GUIDE TUBES IN MOTOR VEHICLES

[75] Inventors: Fritz Marr, Offenbach am Main; Hans Dauernheim, Sprendlingen, both of Germany

[73] Assignee: H.T. Golde GmbH, Frankfurt am Main, Germany

[22] Filed: June 29, 1973

[21] Appl. No.: 375,070

[30] Foreign Application Priority Data
July 3, 1972 Germany............................ 2232597

[52] U.S. Cl. ................ 403/346; 403/400; 403/382
[51] Int. Cl.² ......................... F16D 1/00; B25G 3/00
[58] Field of Search ........... 403/233, 234, 237, 346, 403/347, 363, 382, 386, 387, 396, 397, 400, 403; 74/501, 502, 480 B; 24/81 PE, 262, 159

[56] References Cited
UNITED STATES PATENTS
| | | | |
|---|---|---|---|
| 3,436,047 | 4/1969 | Foltz................................ | 403/363 X |
| 3,685,863 | 8/1972 | Oetiker.............................. | 403/396 X |

FOREIGN PATENTS OR APPLICATIONS
| | | | |
|---|---|---|---|
| 1,302,618 | 1962 | France................................ | 403/400 |
| 933,654 | 1955 | Germany............................ | 403/396 |
| 647,072 | 1962 | Italy.................................. | 403/400 |

*Primary Examiner*—Werner H. Schroeder
*Assistant Examiner*—Wayne L. Shedd
*Attorney, Agent, or Firm*—Toren, McGeady and Stanger

[57] ABSTRACT

In a device for fastening a slotted guide tube used in the displacement of sliding windows or doors in an automobile, a fastening plate is provided with a pair of arms for holding the guide tube against lateral displacement, the arms can be formed directly from the fastening plate or can be attached to it by rivets or by a spring biased engagement. In addition, an interengagement is provided between the fastening plate and the guide tube by having projections on one fitted into depressions or openings in the other. Preferably, the projections are formed outwardly from the guide tube and fit into depressions in the fastening plate. However, a reversal of the arrangement is used for fixing the end of the guide tube to the fastening plate.

6 Claims, 16 Drawing Figures

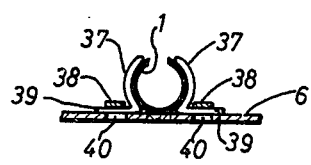
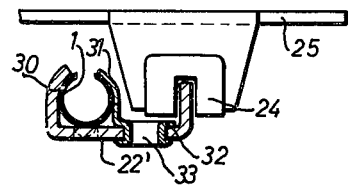
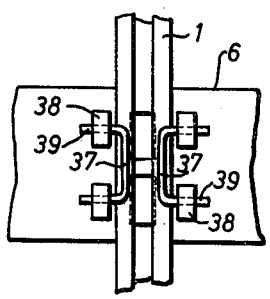
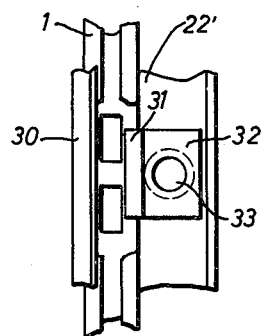
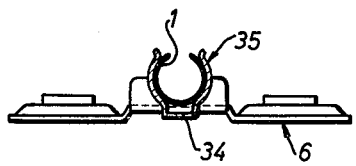
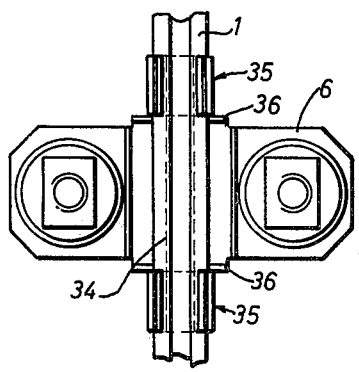

DEVICE FOR FASTENING CABLE GUIDE TUBES IN MOTOR VEHICLES

SUMMARY OF THE INVENTION

The present invention is directed to a fastening device for securing a slotted guide tube through which a pressure rigid cable extends for operating moving parts in an automobile, such as sliding roofs and sliding windows, and, more particularly, it concerns an arrangement for securing guide tubes to a fastening plate.

In known systems for operating sliding windows and sliding roofs in an automobile, a driver is connected on the cable within the guide tube and through the medium of a tongue or similar member extending through the slot in the guide tube it effects adjusting movement through a frictional connection to the part being moved. During the attachment of the guide tube to the motor vehicle, for example, when fixing the window lifter guide tube on the inner plate of a vehicle door, the longitudinally extending slot in the guide tube must not be obstructed by the attachment means, at least not in the range of the driver tongue. In practice, the fastening problem has been solved in the past by soldering or welding the guide tube on fastening plates or directly on parts of the vehicle. A welding method where spot welding is applied through the longitudinal slot of the guide tube has proved to be particularly satisfactory.

While the spot welding procedure has been effective in fastening the guide tube and meets all the requirements in a mechanical respect, it has been found that local deformations of the guide tube may occur during the welding and result in undesired noises during the displacement of the cable within the tube. Any projection extending into the interior of the guide tube as may be formed during the spot welding procedure, may interfere with the thread-like winding on the cable which could easily cause clattering sounds during the adjusting operation. Reworking the points of attachment of the guide tube to eliminate such projections is very difficult, because the tool for carrying out the reworking must be passed through the relatively narrow longitudinally extending slot in the tube. Further, care must also be taken in the reworking operation that the slot edges are not damaged.

Therefore, the present invention is directed to the elimination of the disadvantages experienced in the methods presently used in securing guide tubes in a vehicle and to provide an attachment which affords a rapid and safe connection between the guide tube and the vehicle without forming any projections which protrude into the interior of the guide tube.

In accordance with the present invention, the fastening device is characterized by a fastening plate containing one or more recesses or depressions arranged to receive projections pressed outwardly from the guide tube and a pair of arms connected to the fastening plate for clipping the guide tube to the plate. The arms are arranged so that they terminate short of the slot in the tube and do not interfere with the operation of the cable. The projections pressed outwardly from the guide tube engage in form-closed recesses in the fastening plate and are further secured against displacement by the arms. As a result, a very reliable attachment of the guide tube to the fastening plate is obtained which prevents both rotation of the guide tube and its displacement in the axial direction.

In another feature of the invention, the end of the slotted guide tube can be attached to a fastening plate or similar member so that the pressure rigid cable is prevented from extending outwardly from the end of the tube. In this arrangement a reversal of the above attachment is provided by forming a projection on the fastening plate which engages within an opening in the guide tube. To secure the interengagement of the fastening plate and the guide tube the arms press the tube against the fastening plate and, as described above, the arms terminate short of the slot in the tube. In this attachment arrangement, the projection formed from the fastening plate can readily engage the interior of the tube outside the range of motion of the end of the cable, without disturbing the displacement of the cable. Moreover, the projection can also serve as a stop within the tube to limit the extent of movement of the cable from the end of the tube.

A particularly effective connection of the guide tube to the fastening plate can be obtained without the use of tools, if one or more openings are provided in the fastening plate and the two securing arms are provided as parts of a two-arm spring clip with the arms passing through one or a pair of openings in the plate. In this embodiment, the spring clip is initially attached to the fastening plate and forms a clip-type receiver for the guide tube.

In another arrangement the gripping arms for the guide tube can be bent directly out of the fastening plate itself and, while such an arrangement requires the use of tools for bending the arms about the guide tube, it avoids the attachment of additional parts to the fastening plate. In another variation of the attachment of the arms to the fastening plate, rivets or the like can be used for connecting flanges on the arms to the fastening plate. In this arrangement bending of the arms to the guide tube is not necessary, instead pre-bent arms can be riveted to the fastening plate.

In still another embodiment of the fastening device, one of the arms can be formed directly from the fastening plate itself while the other arm is a separate member which is secured to the fastening plate by rivets or the like.

If both of the arms are formed out of the fastening plate, the plate is preferably formed of spring steel.

Depending on the conditions involved, two or more pairs of arms can be provided in spaced relation on the fastening plate, and the arms can be formed from the fastening plate itself or secured to it by attachment elements.

In a variation of the arrangement where two or more pairs of arms are provided on the fastening plate, several pairs of arms can be formed on a spring clip-type member where the pairs of arms are connected to each other by a web. When mounted on the fastening plate the web bears against the opposite side of the fastening plate from the side from which the arms extend. Further, the adjacent ends of the arms also bear against transversely extending parts of the fastening plate. In this embodiment, the fastening device is provided without the use of tools, since the spring clip-type pairs of arms can be pressed on the guide tube like a clip. A particularly favorable connection between the fastening plate and guide tube is obtained if the adjacent end faces of the arms bear against transversely extending edges of the fastening plate. Further, the transversely extending edges can be bent upwardly in the same direction as the arms and provided with cutouts which correspond to the shape of the exterior of the guide tube so that the tube can be seated in a form-fitting engagement within the cutouts.

In yet another embodiment of the invention, ear- or tongue-shaped projections can be formed from the fastening plate on both sides of the guide tube so that stirrup-shaped ends of individual arms formed of steel spring wire can be engaged within holders formed by the combination of the projections and the fastening plate.

The attachment arrangement in accordance with the present invention can also be provided without the use of additional fastening plates, for example, if, as the fastening plate, a known profiled guide rail is used which serves as a guide carriage connected to a sliding window. The fastening plate can also be replaced by any other part connected rigidly to the vehicle, such as in the case of a window by the inner door plate itself.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1b is a plan view of the embodiment shown in FIG. 1a;

FIG. 2b is a plan view of the embodiment shown in FIG. 2a;

FIG. 3b is a plan view of the embodiment shown in FIG. 3a;

FIG. 4b is a plan view of the embodiment shown in FIG. 4a;

FIG. 5b is a plan view of the embodiment shown in FIG. 5a;

FIG. 6a is a sectional view of a still further embodiment of the present invention;

FIG. 6b is a plan view of the embodiment shown in FIG. 6a;

FIG. 7a is a sectional view of a still further embodiment of the present invention;

FIG. 7b is a plan view of the embodiment shown in FIG. 7a;

FIG. 8a is a sectional view of a yet further embodiment of the present invention; and FIG. 8b is a plan view of the embodiment shown in FIG. 8a.

DETAILED DESCRIPTION OF THE INVENTION

Figure 2A:
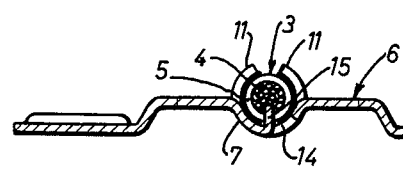
FIG. 2a is a sectional view of another embodiment of the present invention.
Figure 2B:
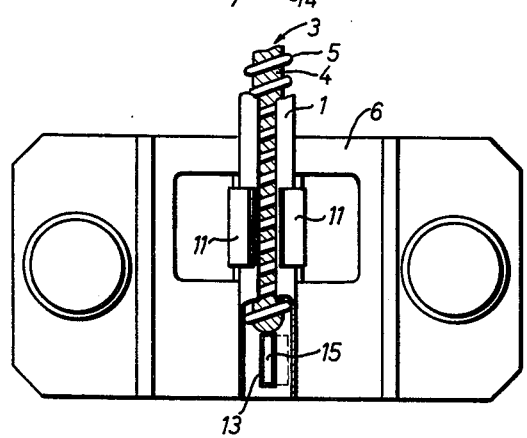

In each of the figures of the drawing, only the portion of a guide tube 1 fixed to the attachment device is illustrated. The guide tube has a longitudinally extending slot 2, however, the driver passing through the slot is not shown in the drawing. A cable 3 positioned within the guide tube 1 is illustrated in FIGS. 2a and 2b and consists, in a known manner, of a multiple-wire flexible core 4 with a threadlike winding 5 wound helically about the exterior of the core. Though not shown, a pinion for effecting the displacement of the cable is provided in driving engagement with the winding.

Figure 1A:
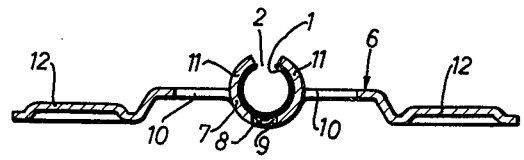
FIG. 1a is a cross-sectional view of one embodiment of the present invention.
Figure 1B:
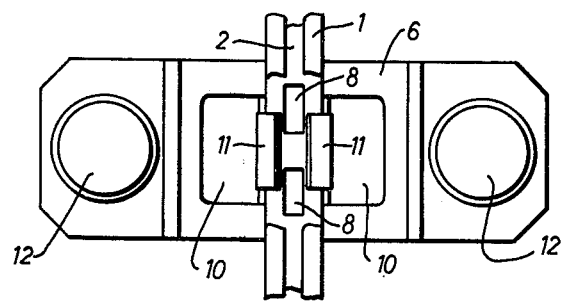

In FIGS. 1a and 1b, a fastening plate 6 has an arcuately-shaped depression or trough 7 extending across its width with the guide tube 1 fitted into the depression. Two projections 8 are pressed outwardly from the guide tube and engage in corresponding, and in this case continuous, depressions 9 formed in the lower surface of the depression 7. The axial position of the projections 8 can best be viewed in FIG. 1b, in which the guide tube 1 is cut away for this purpose. From cutouts 10 formed in the fastening plate 6, arms 11 are bent into form-fitting contact with the outer surface of the guide tube. The free ends of the arms 11 terminate short of the slot 2 in the tube so that there is no interference with the operation of the cable. Accordingly, a permanent fixed engagement of the projections and the depressions is ensured and the fastening plate 6 cannot turn about the tube axis nor can it move axially along the tube. In the plate on each side of and spaced outwardly from the guide tube 1, pressed-out surfaces 12 are provided for the attachment of the fastening plate along with the guide tube to a stationary part of the vehicle body, for example, to the inner door plate if the guide tube and cable is used as a window lifter. If the fastening plate 6 is formed of spring steel, its arms 11 are bent into the desired shape during manufacture before the tube bend is tempered, so that the arms hold the guide tube like a spring clip.

Figure 3A:
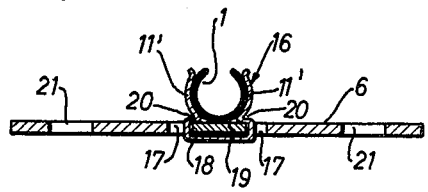
FIG. 3a is a sectional view of still another embodiment of the present invention.
Figure 3B:
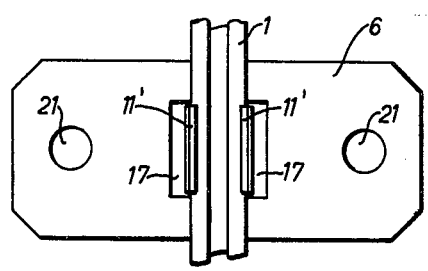

In the embodiment shown in FIGS. 2a and 2b, the end of the guide tube 1 is secured to a fastening plate 6. The attachment is provided by reversing the arrangement shown in FIGS. 1a and 1b by providing an opening 13 in the guide tube diametrically opposite the slot instead of the projection pressed outwardly from the tube. This arrangement is best illustrated in FIG. 2b. Therefore, no depressions are formed in the groove 7 of the fastening plate, instead a projection 15 is bent inwardly from a cutout 14 of the plate within the groove, into engagement with the opening 13. The interengagement provided between the opening 13 and the projection 15 in combination with the arms 11 ensure, as described with regard to the embodiments in FIGS. 1a and 1b, a non-rotatable and axially non-displaceable fastening of the guide tube 1 to the fastening plate 6. Moreover, the projection 15 extending inwardly into the guide tube also serves as a path-limiting stop for the cable 13. In FIGS. 3a and 3b a spring clip arrangement 16 is exhibited for holding the guide tube 1 onto the fastening plate 6. The spring clip 16 has a pair of arms 11' which extend through two slot-like openings 17 in the fastening plate 6 into engagement with the opposite sides of the guide tube 1. The openings 17 are spaced apart by the part 19 of the fastening plate and web 18 of the spring clip interconnects the ends of the arms and the web bears against the lower surface of the part 19 of the plate, that is the opposite side of the plate from the guide tube 1. On the opposite side of the fastening plate from the web 18, the spring clip 16 has a necked-down portion 20 which clips the arms to the fastening plate. Naturally, in this embodiment it is also possible to provide projections pressed outwardly from the guide tube and to form corresponding depressions in the fastening plate to secure the guide tube and fastening plate in a non-rotatable and axially non-displaceable connection. The fastening plate can be shaped to provide a groove in the range between the openings 17 to receive the guide tube 1 in a form-fitting manner, as illustrated in FIGS. 1a and 1b. Bores or openings 21 are provided in the fastening plate spaced outwardly from the guide tube for attaching the arrangement to a stationary part.

Figure 4A:
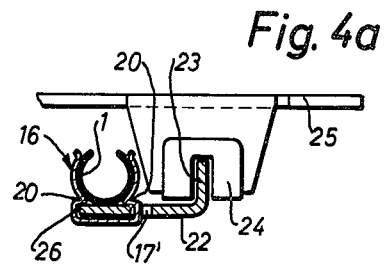
FIG. 4a is a sectional view of a further embodiment of the present invention.
Figure 4B:
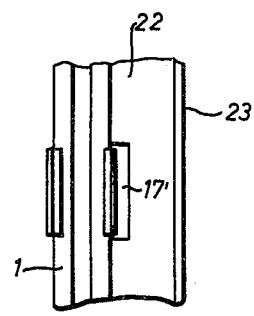

In FIGS. 4a and 4b a portion of a profiled guide rail 22 is shown having an upwardly bent part 23 on which slides 24 of a carriage 25 for a sliding window, are guided, note FIG. 4a where this arrangement is shown schematically. The guide tube 1 is secured on the guide rail 22 in a manner similar to that described with regard to FIGS. 3a and 3b by means of a spring clip 16. A slot-type opening 17' is provided in the guide rail extending parallel to its edge 26 so that one arm of the spring clip 16 extends through the opening 17'. The spring clip 16 has a necked-down portion 20 which affords the clipping action onto the edge 26 on one side and to the adjacent edge forming the opening 17' on the other side. The guide tube is fitted into the spring clip 16 for attachment to the guide rail 22. As can be appreciated, it is possible to arrange a number of spring clips spaced along the length of the guide rail for attaching the guide tube. Though not shown, in this embodiment it is also possible to provide the guide tube 1 and the guide rail 22 with corresponding projections and depressions so that an interengagement is provided which locks against both rotational an axial displacement.

Figure 5A:
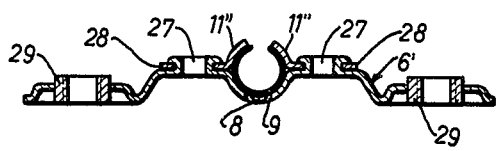
FIG. 5a is a sectional view of yet another embodiment of the present invention.
Figure 5B:
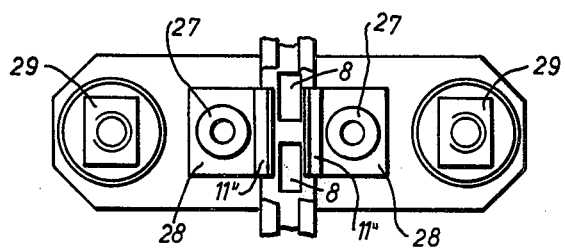

The embodiment shown in FIGS. 5a and 5b is similar to that in FIGS. 1a and 1b. However, instead of having the arms bent outwardly from the fastening plate, the arms 11' are separate members and are attached to the fastening plate 6 by rivets 27. Accordingly, the ends of the arms spacd from the portions which engage the guide tube, form flanges 28 which bear against the surface of the fastening plate 6'. In this arrangement, prevention of rotational and axial displacement is attained by the projections 8 pressed outwardly from the guide tube and the depressions 9 formed in the fastening plate which receive the projections. For attaching the fastening plate to a stationary part of the vehicle, nuts 29 are secured to the fastening plate.

In FIGS. 6a and 6b another embodiment of the fastening device similar to that shown in FIGS. 4a and 4b is illustrated where the guide tube 1 is fixed to a guide rail 22'. For at least a portion of the length of said guide rail it has an outer edge which forms an arm 30 in engagement with one side of the guide tube 1. The other arm 31 of the pair of arms is a separate part which has a flange 32 for attachment by a rivet 33 to the rail 22'. As in the other embodiments, in this arrangement projections could be pressed outwardly from the guide tube so that they fit into corresponding depressions in the guide rail to provide a lock against rotational and axial displacement.

In FIGS. 7a and 7b another embodiment of the fastening device is shown using a spring clip. The spring clip consists of two pairs of arms 35 spaced apart in the axial direction of the guide tube 1 and connected to one another by a web 34. The adjacent end faces of the arms 35 each bear along an opposite edge 36 of the fastening plate which extends transversely of the guide tube. The web 34 contacts the surface of the fastening plate 6 on the opposite side from the guide tube. The upwardly turned edges 36 of the fastening plate are cut out to conform to the shape of the guide tube so that the guide tube seats within these cutouts in a form-fitting engagement. During the assembly of this fastening device, the spring clip assembly 34, 35 is secured by inserting the arms of the clip over each end edge 36 of the fastening plate before the guide tube 1 is snapped into form-fitting engagement with the arms 35. In this embodiment, a locking engagement for preventing rotational and axial displacement can be provided as in the other embodiments.

In the embodiment illustrated in FIGS. 8a and 8b, a spring clip connection is afforded, however, the arms of the spring clip are designed as separate parts, that is the arms 37 are bent in a stirrup-like form from spring steel wire. To attach the arms to the fastening plate 6, ears 38 are pressed outwardly from the fastening plate so that a holder is afforded between the ears and the fastening plate into which the bentoff ends 39 of the stirrup arms 37 are fixed. As can be seen in the combination of FIGS. 8a and 8b, openings 40 are provided in the fastening plate 6 by the formation of the ears 38 and the ends 39 of the arms 37 bridge over the openings or cutouts 40. This arrangement ensures that the arms 37 are tightly clamped for elastic deformation. After the introduction of the ends 39 into the holders provided between the ears 38 and the fastening plate 6, the guide tube can be fitted between the arms 37 which initially will yield resiliently to the outside and then bear inwardly against the outer surface of the guide tube for holding it in position. As with the other embodiments, this arrangement can also be provided with projections and depressions to afford the lock against rotational and axial displacement.

The fastening device described in the foregoing embodiments, which can be attached in part without tools, can also be mounted safely in a simple manner. In no instance are undesired projections formed which would tend to cause noise during the displacement of the cable within the guide tube. Further, some of the above-described fastening devices can be disassembled without destroying any of the parts.

The groove 7 illustrated in FIGS. 1a–2b, and the arcuate cutouts in the edges 36, as illustrated in FIGS. 7a and 7b, have the same function, that is to prevent transverse movement between the guide tube and the fastening plate.

While specific embodiments of the invention have been shown and described in detail to illustrate the application of the inventive principles, it will be understood that the invention may be embodied otherwise without departing from such principles.

What is claimed is:

1. Device for fastening an axially elongated slotted guide tube for a pressure rigid cable which can be displaced within said guide tube for operating movable parts in a vehicle, such as a sliding window or sliding roof in an automobile, comprising a fastening plate, said guide tube having a circularly shaped outer surface and being arranged on said fastening plate with its slot facing outwardly from said fastening plate, the circular shaped outer surface of said guide tube being in direct surface contact with the surface of said fastening plate, means for interengaging said guide tube and said fastening plate, a two pair of arms connected to said fastening plate and extending about and in pressing contact with the circularly shaped outer surface of said guide tube on opposite sides of the slot therein and with the ends of said arms contacting said guide tube terminating short of the slots in said guide tube so that said arms secure said guide tube to said fastening plate, and said interengaging means comprising a projection formed from the surface of one of said fastening plate and said guide tube and extending at least into the surface of the other one of said fastening plate and said guide tube to provide interengagement therebetween so that said interenaging means prevent both displacement of said guide tube in its axial direction and rotation of said guide tube about its axis.

2. Device, as set forth in claim 1, wherein said means for interengaging said guide tube to said fastening plate comprises at least one depression formed in said fastening plate and at least one said projection formed from said guide tube and arranged to seat within said depression for effecting the interengagement.

3. Device, as set forth in claim 2, wherein said projection is pressed outwardly from said guide tube.

4. Device, as set forth in claim 1, wherein at least two pair of said arms are connected to said fastening plate and are spaced apart in the axial direction of said guide tube.

5. Device, as set forth in claim 4, wherein at least two pair of said arms comprises a pair of two-arm spring clips, a web secured to and extending between said pair of spring clips for securing them together and with said web arranged to contact the opposite side of said fastening plate from the side on which the arms of said spring clips extend, and the adjacent end edges of the said two-arm spring clips are disposed in contacting engagement with said fastening plate.

6. Device, as set forth in claim 5, wherein the edges of said fastening plate with which the adjacent end edges of said two-arm spring clips engage are bent upwardly in the direction of said guide tube and extend transversely of said guide tube, and the bent-up edges of said fastening plate are cut out to conform to the profile of the outer surface of said guide tube so that said guide tube seats in form-fitting engagement in the cutouts in said bent-up edges.

* * * * *